US011806865B2

(12) United States Patent
Ayuzawa et al.

(10) Patent No.: US 11,806,865 B2
(45) Date of Patent: Nov. 7, 2023

(54) ROTARY ACTUATOR AND ROBOT

(71) Applicant: NIDEC CORPORATION, Kyoto (JP)

(72) Inventors: Yuu Ayuzawa, Kyoto (JP); Takeshi Okuda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/549,424

(22) Filed: Dec. 13, 2021

(65) Prior Publication Data

US 2022/0097242 A1     Mar. 31, 2022

Related U.S. Application Data

(62) Division of application No. 16/529,036, filed on Aug. 1, 2019, now abandoned.

(30) Foreign Application Priority Data

Aug. 2, 2018   (JP) ................................. 2018-146312
Dec. 6, 2018   (JP) ................................. 2018-229119

(51) Int. Cl.
*B25J 19/00* (2006.01)
*B25J 9/12* (2006.01)
(Continued)

(52) U.S. Cl.
CPC ........... *B25J 19/0004* (2013.01); *B25J 9/126* (2013.01); *B25J 17/00* (2013.01); *F16D 63/006* (2013.01);
(Continued)

(58) Field of Classification Search
CPC ........ B25J 19/0004; B25J 9/126; B25J 17/00; F16D 63/006; F16D 65/16; F16D 2121/22; H02K 7/125
(Continued)

(56) References Cited

U.S. PATENT DOCUMENTS 2,959,695 A   11/1960   Huff
3,110,830 A   11/1963   Smith
(Continued)

FOREIGN PATENT DOCUMENTS

JP    H05043440 U    6/1993
JP    H09288925 A    11/1997
(Continued)

OTHER PUBLICATIONS

CNIPA Notification of First Office Action for corresponding CN Application No. 201910707408.5; dated May 18, 2022.
(Continued)

*Primary Examiner* — T. Scott Fix
(74) *Attorney, Agent, or Firm* — CANTOR COLBURN LLP

(57) ABSTRACT

There is provided a rotary actuator which makes it possible to operate a regulation release of a regulating member from the outside of a case body when the regulating member is in a regulation position, and can prevent an unexpected regulation release, and a robot. A drive mechanism of a joint part has a compression coil spring for biasing a regulation pin toward a regulation position, and a solenoid for moving the regulation pin 32 toward a regulation release position. A through hole is formed in a case body at a portion facing the upper end portion (the other end portion opposite to one end portion abutting against the regulation pin) of a plunger of the solenoid, and the upper end portion of the plunger is positioned on the inside of the case body while the regulation pin is in the regulation position.

3 Claims, 12 Drawing Sheets

(51) Int. Cl.
*F16D 65/16* (2006.01)
*F16D 63/00* (2006.01)
*B25J 17/00* (2006.01)
F16D 121/22 (2012.01)

(52) U.S. Cl.
CPC .......... *F16D 65/16* (2013.01); *F16D 2121/22* (2013.01)

(58) Field of Classification Search
USPC ........ 74/490.03; 188/71.1, 72.1, 72.3, 73.31, 188/73.35, 73.36, 73.37, 73.44
See application file for complete search history.

(56) References Cited

U.S. PATENT DOCUMENTS

| | | | |
|---|---|---|---|
| 5,847,522 A | 12/1998 | Barba | |
| 5,893,439 A * | 4/1999 | Park | B60T 1/005 192/219.5 |
| 6,250,433 B1 * | 6/2001 | Sealine | B60T 1/005 188/69 |
| 6,435,320 B1 * | 8/2002 | Drennen | B60T 13/741 188/164 |
| 11,161,258 B2 * | 11/2021 | Boyland | H02K 9/06 |
| 2017/0234377 A1 | 8/2017 | Suzuki | |
| 2018/0281208 A1 | 10/2018 | Fauteux et al. | |
| 2019/0109549 A1 | 4/2019 | Odagiri et al. | |
| 2020/0036094 A1 | 2/2020 | Ayuzawa | |
| 2020/0039094 A1 | 2/2020 | Ayuzawa | |

FOREIGN PATENT DOCUMENTS

| | | | | |
|---|---|---|---|---|
| JP | 2008147875 A | | 6/2008 | |
| JP | 2011058578 A | * | 3/2011 | |
| JP | 2017189081 A | | 10/2017 | |
| KR | 1020150111253 | | 10/2015 | |
| TW | 201736061 A | | 10/2017 | |
| WO | WO-2017148499 A1 | * | 9/2017 | .......... B25J 19/0004 |
| WO | 2017169604 A1 | | 10/2017 | |

OTHER PUBLICATIONS

USPTO Final Office Action for corresponding U.S. Appl. No. 16/529,036; dated Sep. 14, 2021.
USPTO Non-Final Office Action for corresponding U.S. Appl. No. 16/529,036, dated May 26, 2021.
CNIPA Notification of Second Office Action for corresponding CN Application No. 201910707408.5; dated Dec. 1, 2022.

* cited by examiner

ROTARY ACTUATOR AND ROBOT

CROSS-REFERENCE TO RELATED APPLICATION

The present application is a divisional application of U.S. patent application Ser. No. 16/529,036, filed Aug. 1, 2019, the entire contents of which are incorporated herein by reference. The Ser. No. 16/529,036 application claimed the benefit of the date of the earlier filed Japanese Application Nos. 2018-146312, filed on Aug. 2, 2018, No. 2018-229119, filed on Dec. 6, 2018, priority to both of which is also claimed herein, and the content of both of which is incorporated herein.

FIELD OF THE INVENTION

At least an embodiment of the present disclosure relates to a rotary actuator having a motor, a rotation regulating mechanism for the rotation of a motor in a stopped state, and mountable in an industrial machine such as a robot, and a robot having the rotary actuator.

BACKGROUND

An industrial robot including a base as a support member, a first arm connected to the base via a joint part, a second arm connected to the tip side of the first arm via the joint part, and a wrist part connected to the tip side of the second arm via the joint part is known. Further, in this type of industrial robot, the joint part includes a motor having a rotor and a stator, a reduction gear connected to the motor, and a safety brake for maintaining the stopped state of the rotor, and the joint part itself is configured as a rotary actuator.

Moreover, a rotary actuator having a motor, a rotation regulating mechanism for regulating the rotation of a motor in a stopped state is known as a rotary actuator which is mounted on an industrial robot (for example, refer to JP-A-2017-189081).

In the rotary actuator of JP-A-2017-189081, the rotation regulating mechanism includes a disc-shaped rotation-side regulating member fixed to the rotor of the motor, a pin-shaped regulating member which engages with the rotation-side regulating member to regulate the rotational movement, and a drive mechanism for moving the regulating member in an axial direction of the rotor. Further, a plurality of protrusions projecting towards an outer side of a radial direction of the rotor are provided in the periphery of the rotation-side regulating member. Moreover, an annular regulating part which is inserted between adjacent protrusions in a circumferential direction to regulate the rotational movement of the rotation-side regulating member is provided in a tip of the regulating member.

Further, the drive mechanism for moving the regulating member between a regulation position in which the regulating member is disposed between the protrusions in the circumferential direction and a regulation release position in which the regulating member is disengaged from between the protrusions in the circumferential direction. Therefore, the drive mechanism has a biasing member for biasing the regulating member to one side (for example, the upper side) in the axial direction of the rotor, and a solenoid for moving the regulating member to the other side (for example, the lower side) in the axial direction of the rotor. The solenoid has a plunger which presses the regulating member, and when the solenoid is in a non-energized state, i.e., when the regulating member is in the regulation position, the plunger of the solenoid is moved to and held on the upper side of the body of the solenoid.

The rotary actuator of the aforementioned JP-A-2017-189081 is configured so that when the regulating member is in the regulation position, the upper end portion of the plunger of the solenoid protrudes from a through hole formed in a case body. Therefore, the regulation of the rotation regulating mechanism may be easily released from the outside of the case body by the upper end portion of the protruded plunger, and as a result, there is the possibility of causing an unexpected driving of the motor, and there was room for improvements.

The present invention is to provide a rotary actuator which makes it possible to operate the regulation release of a regulating member from the outside of a case body when the regulating member is in a regulation position, and which can prevent an unexpected regulation release, and a robot having such a rotary actuator.

SUMMARY

According to one aspect of the present disclosure, there is provided a rotary actuator including: a motor having a rotor and a stator, a rotation regulating mechanism for regulating the rotation of the rotor in a stopped state, and a case body in which the motor and the rotation regulating mechanism are housed, wherein the rotation regulating mechanism has an annular rotation-side regulating member fixed to the rotor, a regulating member inserted between a plurality of protrusions formed along a circumferential direction on an outer circumferential surface of the rotation-side regulating member and configured to regulate a movement of the rotation-side regulating member in the circumferential direction, and a drive mechanism configured to move the regulating member in an axial direction of the rotor between a regulation position in which the regulating member is disposed between the protrusions in the circumferential direction and a regulation release position in which the regulating member is disengaged from between the protrusions in the circumferential direction, the drive mechanism has a biasing member configured to bias the regulating member toward the regulation position, and a solenoid configured to move the regulating member toward the regulation release position, a plunger of the solenoid has one end portion abutting against the regulating member, and the other end portion opposite to the one end portion, a through hole is formed in a portion of the case body, which faces the other end portion of the plunger of the solenoid, and the other end portion of the plunger is positioned on the inside of the case body while the regulating member is in the regulation position.

In the rotary actuator according to the one aspect of the present disclosure, the other end portion of the plunger of the solenoid is disposed on the inside of the case body even if the regulating member is in either of the regulation position or the regulation release position, and the through hole which can press the other end portion of the plunger from the outside of the case body is formed in the portion of the case body facing the other end portion of the plunger. Therefore, when the regulating member is in the regulation position, the regulation release of the regulating member can be performed from the outside of the case body by pressing the other end portion of the plunger of the solenoid through the through hole of the case body. Further, the plunger of the solenoid is not exposed to the outside from the case body, thus, unintended contact can be avoided in order to prevent an unexpected regulation release.

In the rotary actuator according to the one aspect of the present disclosure, the other end portion of the plunger is positioned on the inside of the through hole while the regulating member is in the regulation position.

According to the one aspect of the present disclosure, it becomes easy to view the other end portion of the plunger of the solenoid through the through hole of the case body when the regulating member is in the regulation position, thus, the other end portion of the plunger can be more easily pressed from the outside of the case body. Further, in this case, when the other end portion of the plunger was pushed, it becomes difficult to see the other end portion of the plunger from the through hole, thus, it can be more easily understood that the regulation release of the regulation material was performed.

The rotary actuator according to the one aspect of the present disclosure includes a wall provided around the through hole on an inner surface of the case body.

According to the one aspect of the present disclosure, the wall functions as a reinforcement portion so that the rigidity of the peripheral portion of the through hole can increase even if the through hole is formed in the case body.

According to the one aspect of the present disclosure, wherein the regulating member is a columnar member with a uniform cross-sectional shape perpendicular to the axial direction.

The regulating member according to JP-A-2017-189081 has a flange portion on one end portion of the regulating member, and is engaged with the rotation-side regulating member at the flange portion. Therefore, in the conventional regulating member, when in engagement with the rotation-side regulating member, the surface pressure is received at the flange portion, and the surface pressure is transmitted via a small diameter portion other than the flange portion to a fixed member of the regulating member which supports the regulating member to be slidably movable, thus, the force transmitted to the fixed member can become large.

According to the one aspect of the present disclosure, the regulating member is a columnar member with a uniform cross-sectional shape perpendicular to the axial direction. When configured as such, a large contact area with the fixed member can be obtained, thus, when making an engagement between the protrusions of the rotation-side regulating member and the regulating member, the surface pressure accompanying the engagement can be reduced. Therefore, the load of the fixed member can be reduced and the influence of wear and stress on the fixed member can be suppressed compared to the conventional regulating member. Further, the structure can be simplified compared to the conventional regulating member, thus, the manufacturing cost can be reduced. Further, the regulation can be reliably performed even when the engagement position between the rotary shaft regulating member and the regulating member is disengaged in the axial direction, and a margin can be provided for the positioning accuracy of the regulating member.

According to the one aspect of the present disclosure, while the regulating member is in the regulation position, a surface of the regulating member, which abuts against the one end portion of the plunger in the regulating member, is positioned further outside between the protrusions structured to sandwich the regulating member in the axial direction.

According to the one aspect of the present disclosure, the engagement between the rotation-side regulating member and the regulating member can be performed more reliably.

According to another aspect of the present disclosure, there is provided a rotary actuator including: a motor having a rotor and a stator, a rotation regulating mechanism configured to regulate a rotation of the rotor in a stopped state, and a case body in which the motor and the rotation regulating mechanism are housed, wherein the rotation regulating mechanism has an annular rotation-side regulating member fixed to the rotor, a regulating member inserted between a plurality of protrusions formed along a circumferential direction on an outer circumferential surface of the rotation-side regulating member and configured to regulate a movement of the rotation-side regulating member in the circumferential direction, and a drive mechanism configured to move the regulating member in an axial direction of the rotor between a regulation position in which the regulating member is disposed between the protrusions in the circumferential direction and a regulation release position in which the regulating member is disengaged from between the protrusions in the circumferential direction, the drive mechanism has a biasing member configured to bias the regulating member toward the regulation position, and a solenoid configured to move the regulating member toward the regulation release position, a plunger of the solenoid has one end portion abutting against the regulating member, and the other end portion opposite to the one end portion, the other end portion of the plunger of the solenoid is positioned in the case body and is covered by the case body so as to not be exposed while the regulating member is in the regulation position, and a portion in the case body, which faces the other end portion of the plunger, is composed of a member having an elasticity capable of being deformed to the other end portion and abutting against the other end portion by receiving an external force from a side that is opposite to the other end portion.

According to another aspect of the present disclosure, the other end portion of the plunger is not exposed from the case body. Therefore, the unintended regulation release can be prevented and it is possible to prevent foreign matter from being mixed inside the case body.

The rotary actuator according to another aspect of the present disclosure, wherein projections projecting toward the other end portion are formed on a surface of the portion of the case body, which faces the other end portion side.

According to another aspect of the present disclosure, the external force can be concentrated toward the other end portion of the plunger due to the projections, and the regulation release operation can be made easier. Further, by appropriately setting the height of the projections, there is no need to elastically deform the aforementioned portion of the case body more than necessary, and the design freedom of the case body can be increased.

According to another aspect of the present disclosure, an outer surface of a region in which the portion was formed in the case body overlaps in the axial direction of the rotation-side regulating member, a side surface of the case body parallel to the axial direction is formed on the outer side of a radial direction of the rotation-side regulating member with respect to the portion, and an inclined surface structured to connect the outer surface of the region with the side surface and inclined relative to the outer surface is formed in the case body.

According to another aspect of the present disclosure, for example, when the entirety of the case body is made of a flexible material, the fulcrum of the case body when the aforementioned portion is elastically deformed can be separated to the inside of the radial direction of the rotation-side regulating member relative to the aforementioned portion, and the aforementioned portion can be easily flexed. Further, the portion connecting the inclined surface with the side surface is a fulcrum on the outside of the radial direction of the rotation-side regulating member relative to the aforementioned portion in the case body, thus, the aforementioned portion can be easily flexed due to the inclined surface. As a result, the regulation release operation can be performed easily, quickly and reliably.

According to still another aspect of the present disclosure, there is provided a robot including a joint part constituted by the rotary actuator according to the foregoing aspect of the present disclosure.

According to still another aspect of the present disclosure, when the regulating member in the joint part is in the regulation position, the regulation release of the regulating member can be operated from the outside of the case body, and an unexpected regulation release can be prevented.

According to the present disclosure, when the regulating member is in the regulation position, the regulation release of the regulating member may be operated from the outside of the case body, and can prevent an unexpected regulation release.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 4A is an enlarged view illustrating the state in which the regulation pin is in the regulation release position, and FIG. 4B is an enlarged view illustrating the state in which the regulation pin is in the regulation position;

FIG. 6A is an enlarged view for describing the state of the upper end portion of a plunger when the regulation pin shown in FIG. 3 is in the regulation position, and FIG. 6B is an enlarged view for describing the state of the upper end portion of the plunger when the regulation pin shown in FIG. 3 is in the regulation release position;

FIG. 9A is an enlarged view for describing the state when the regulation pin is in the regulation position, and FIG. 9B is an enlarged view for describing the state when the regulation pin is in the regulation release position.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

(Schematic Configuration of an Industrial Robot)

Figure 1:
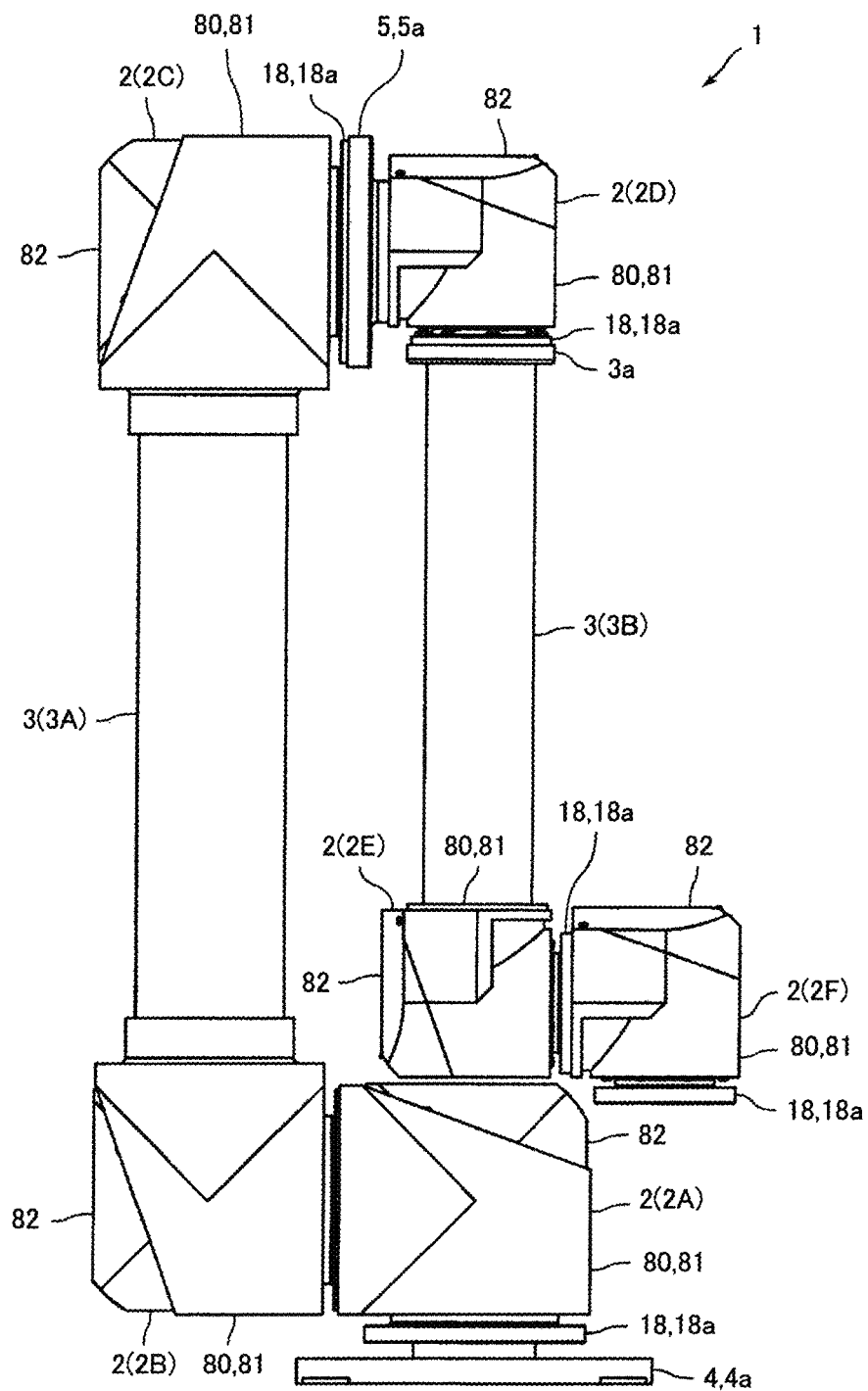
FIG. 1 is a front elevation view of an industrial robot according to an embodiment of the present invention.
Figure 2A:
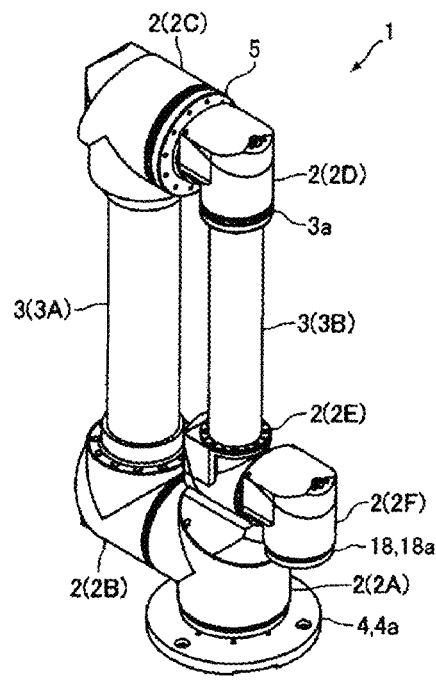
FIG. 2A is a perspective view of the industrial robot shown in FIG. 1.

First, with reference to FIG. 1 and FIG. 2A and FIG. 2B, a configuration of an industrial robot according to the embodiment of the present disclosure will be described. FIG. 1 is a front elevation view of the industrial robot according to an embodiment of the present disclosure. FIG. 2A is a perspective view of the industrial robot shown in FIG. 1, and FIG. 2B is a perspective view illustrating an example in which the industrial robot shown in FIG. 2A is operated.

Figure 2B:
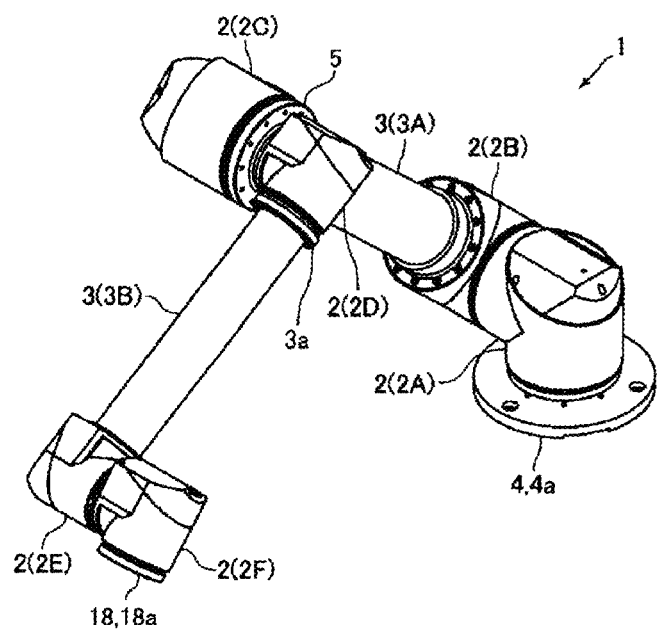
FIG. 2B is a perspective view illustrating an example in which the industrial robot shown in FIG. 2A is operated.

As shown in FIG. 1 and FIG. 2A and FIG. 2B, the industrial robot (hereinafter, referred to as the "robot") 1 of the present embodiment is an articulated robot used in the assembly or the manufacture of a predetermined product, and is installed and used in an assembly line or a manufacturing line. The robot 1 includes a plurality of joint parts 2 and a plurality of arms 3. In the present embodiment, the robot 1 includes six joint parts 2 and two arms 3.

Note that, when the six joint parts 2 are distinguished from each other, the respective six joint parts 2 are referred to as a "first joint part 2A", a "second joint part 2B", a "third joint part 2C", a "fourth joint part 2D", a "fifth joint part 2E" and a "sixth joint part 2F". Further, in the following description, when the two arms 3 are distinguished from each other, the respective two arms 3 are referred to as a "first arm 3A" and a "second arm 3B".

Further, the robot 1 further includes a support member 4 which is connected to the first joint part 2A to be relatively rotatable. The support member 4 has a flange portion 4a and is formed in a flanged cylindrical shape. A through hole (not shown) penetrating in the axial direction of the support member 4 is formed on the inner circumferential side of the support member 4. The flange portion 4a is formed in an annular shape and constitutes a bottom surface portion as the base of the robot 1. Further, the arms 3 are formed in an elongated cylindrical shape.

The first joint part 2A and the second joint part 2B are connected to be relatively rotatable in the robot 1, and the second joint part 2B and a base end of the first arm 3A are fixed together. Further, a tip end of the first arm 3A and the third joint part 2C are fixed, and the third joint part 2C and the fourth joint part 2D are connected to be relatively rotatable. Furthermore, the fourth joint part 2D and a base end of the second arm 3B are connected to be relatively rotatable, a tip end of the second arm 3B and the fifth joint part 2E are fixed, and the fifth joint part 2E and the sixth joint part 2F are connected to be relatively rotatable. Further, a hand, a tool or the like can be installed on the sixth joint part 2F to be relatively rotatable.

Hereinafter, a specific configuration of the joint part 2 will be described. As shown in FIG. 1, in the present embodiment, the first joint part 2A, the second joint part 2B and the third joint part 2C may be formed to be the same size, and the fourth joint part 2D, the fifth joint part 2E, and the sixth joint part 2F may be formed to be the same size. Further, the sizes of the first joint part 2A, the second joint part 2B, and the third joint part 2C are larger than the sizes of the fourth joint part 2D, the fifth joint part 2E, and the sixth joint part 2F. However, the first joint part 2A, the second joint part 2B, the third joint part 2C, the fourth joint part 2D, the fifth joint part 2E, and the sixth joint part 2F may be formed to have the same configuration, except for the difference in size.

(Configuration of Joint Part)

Figure 3:
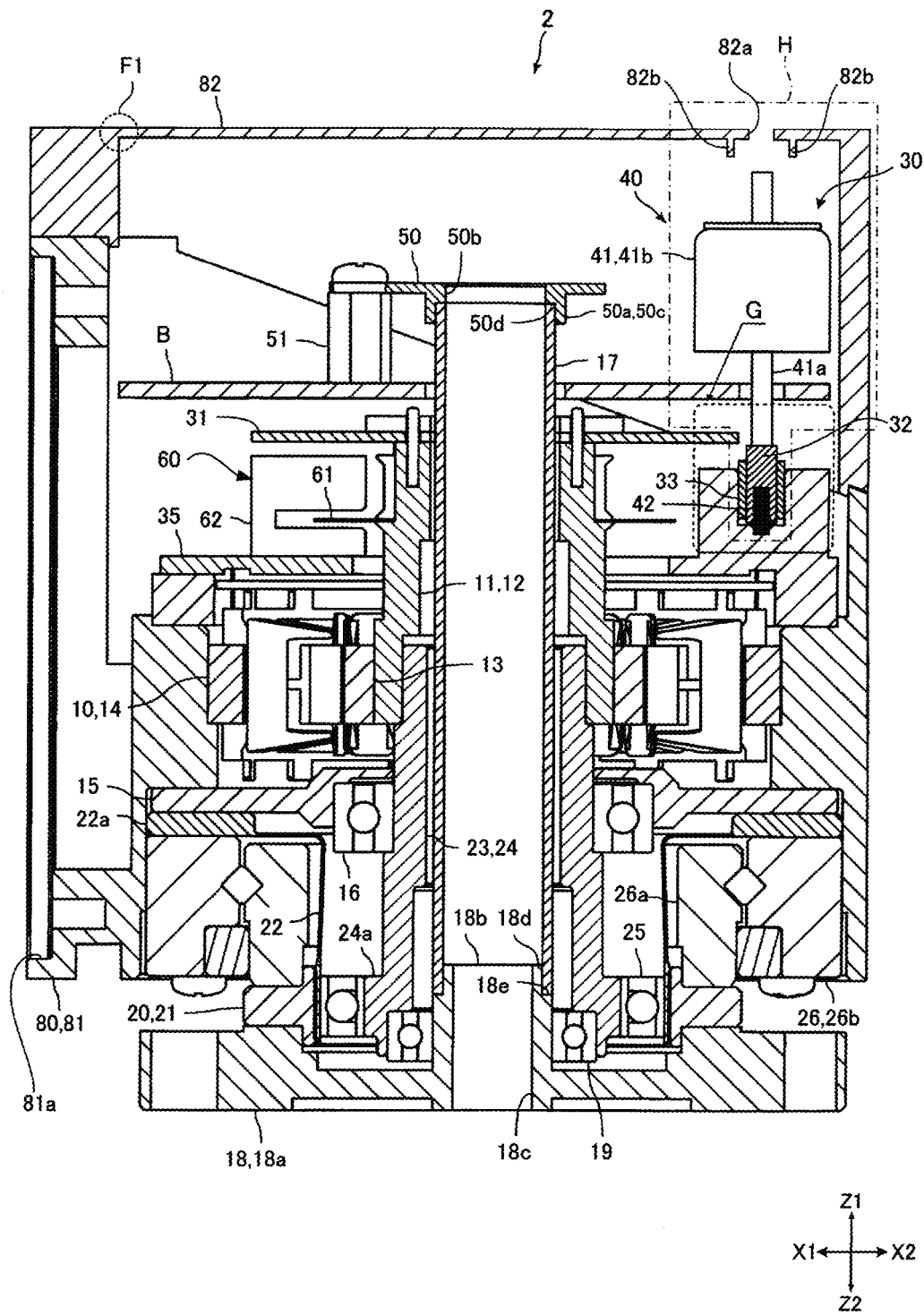
FIG. 3 is a longitudinal cross-sectional view of a joint part shown in FIG. 1.
Figure 4A:
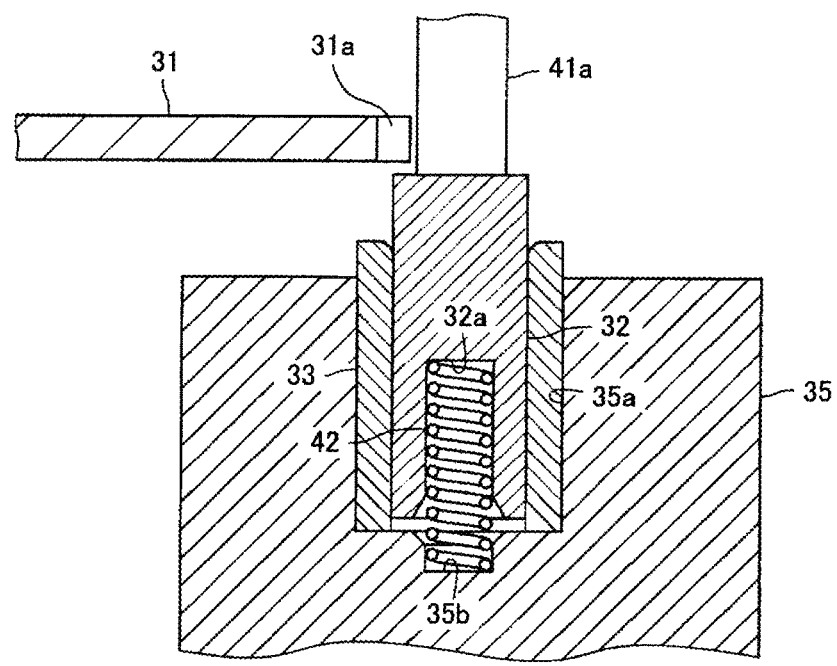
FIG. 4A and FIG. 4B are enlarged views for describing the configuration of a G portion shown in FIG. 3.
Figure 4B:
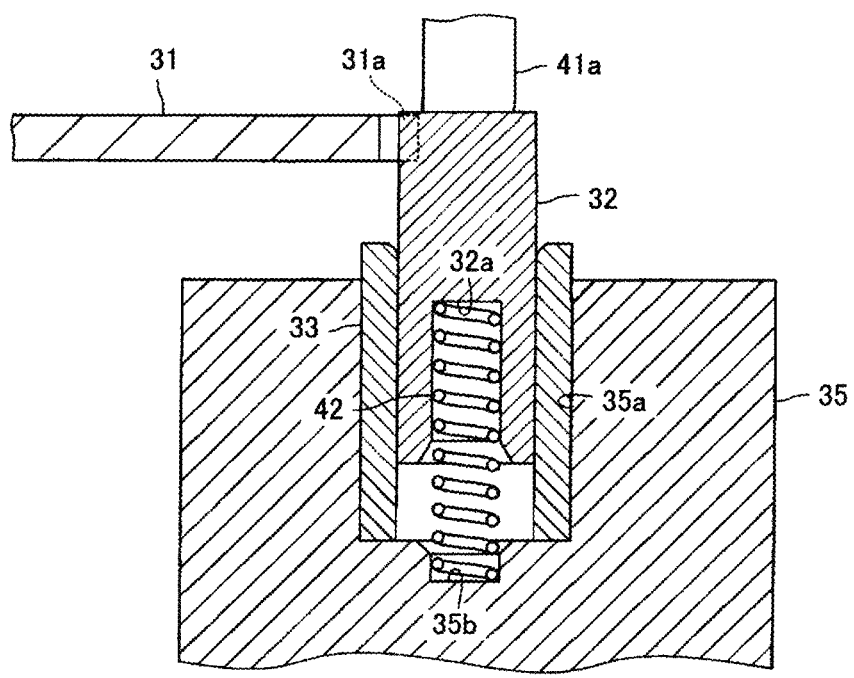
Figure 5:
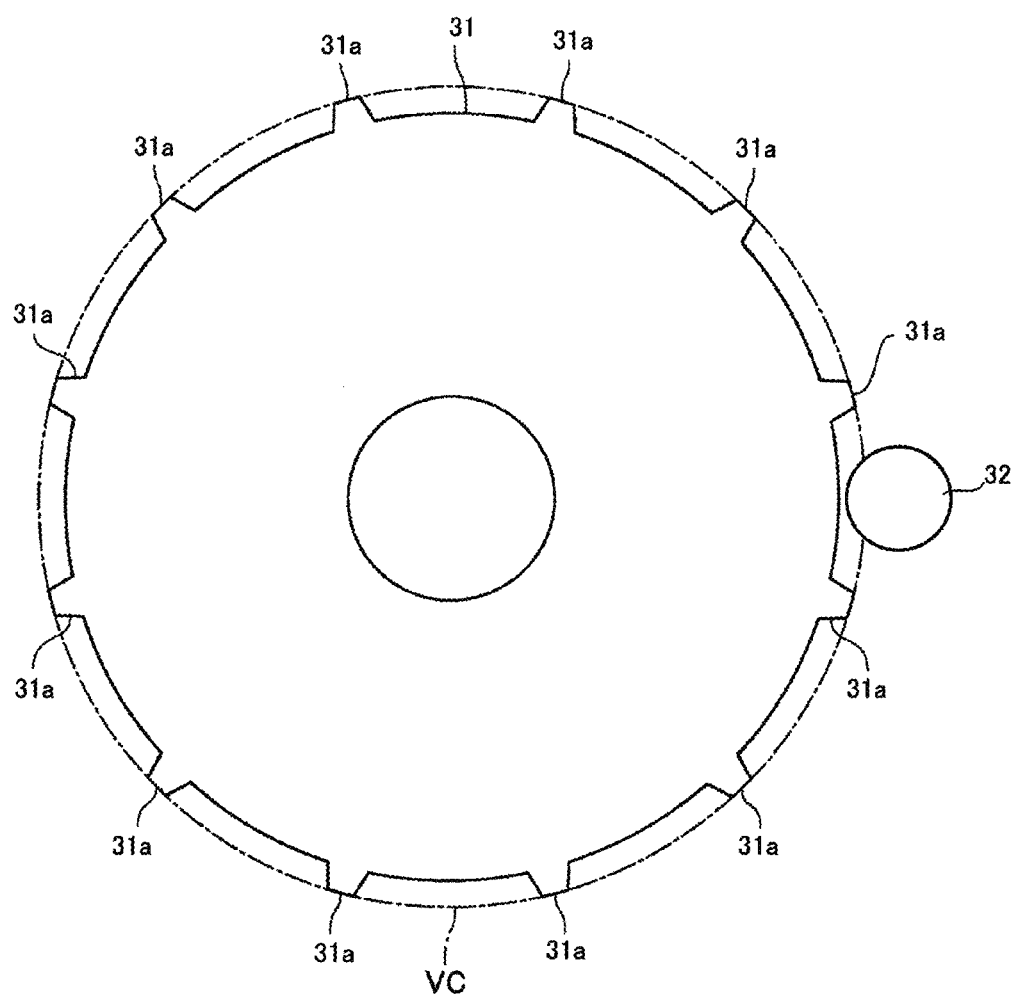
FIG. 5 is a plan view of the rotation-side regulating member and the regulation pin shown in FIG. 3.
Figure 6A:
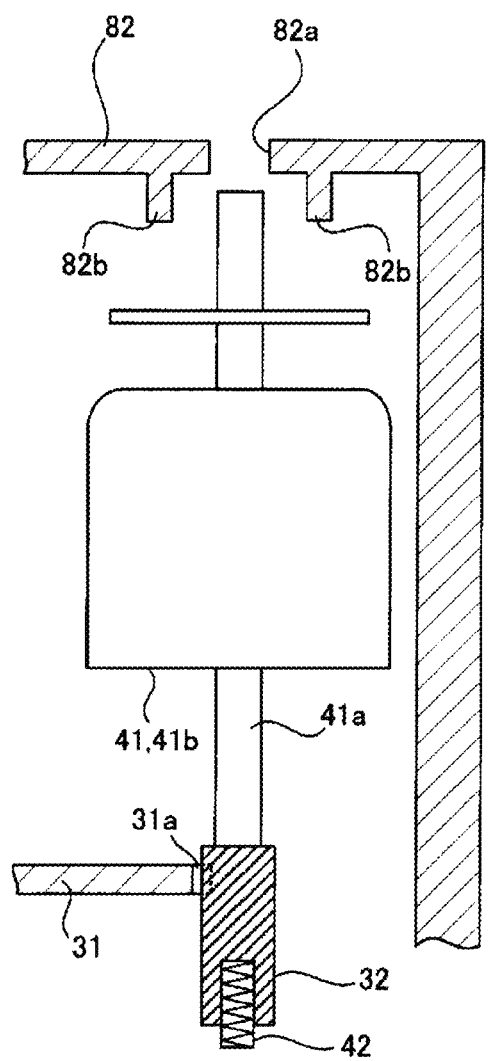
FIG. 6A and FIG. 6B are enlarged views for describing the configuration of an H portion shown in FIG. 3.
Figure 6B:
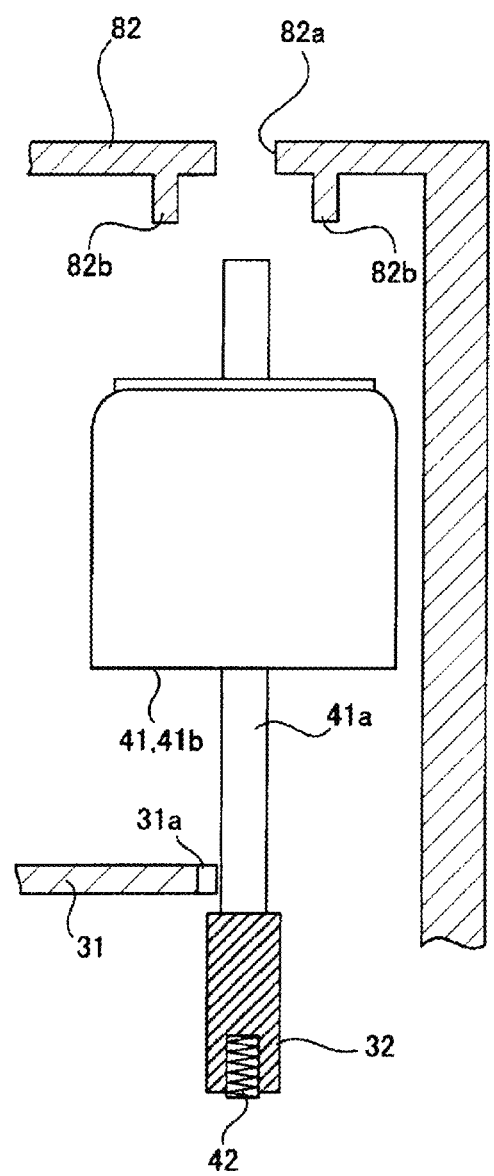

Next, the configuration of the joint part 2 will be specifically described with reference to FIG. 3 to FIG. 6A and FIG. 6B. FIG. 3 is a longitudinal cross-sectional view of the joint part 2 shown in FIG. 1. FIG. 4A and FIG. 4B are enlarged views for describing the configuration of the G portion shown in FIG. 3, FIG. 4A is an enlarged view illustrating the state in which a regulation pin (regulating member) 32 is in the regulation release position, and FIG. 4B is an enlarged view illustrating the state in which the regulation pin 32 is in the regulation position. FIG. 5 is a plan view of a rotation-side regulating member 31 and the regulation pin 32 shown in FIG. 3. FIG. 6A and FIG. 6B are enlarged views for describing the configuration of H portion shown in FIG. 3, FIG. 6A is an enlarged view for describing the state of the upper end portion of a plunger 41a when the regulation pin 32 shown in FIG. 3 is in the regulation position, and FIG. 6B is an enlarged view for describing the state of the upper end portion of the plunger 41a when the regulation pin 32 shown in FIG. 3 is in the regulation release position.

In the following description, for the sake of convenience, a Z1 direction side in FIG. 3 will be referred to as the "upper" side, and a Z2 direction side opposite thereto will be referred to as the "lower" side. Further, an X1 direction side in FIG. 3 will be referred to as the "left" side, and an X2 direction side opposite thereto will be referred to as the "right" side.

As shown in FIG. 3, the joint part 2 is configured with a motor 10, a reduction gear 20 which is connected to the motor 10, a position detection mechanism 60 for detecting the rotational position of the motor 10, a circuit board B to which the motor 10 and the position detection mechanism 60 are electrically connected, and a case body 80 which stores the motor 10, the reduction gear 20, the position detection mechanism 60, and the circuit board B, and the joint part 2 itself is constituted as a rotary actuator.

The motor 10 is a hollow motor in which a through hole is formed in the center in the radial direction and has a hollow rotary shaft 12. Further, the motor 10 includes a rotor 11 and a stator 14. Further, the reduction gear 20 is a hollow reduction gear in which a through hole is formed in the center in the radial direction. The motor 10 and the reduction gear 20 are disposed so as to overlap in the vertical direction. Specifically, the motor 10 is disposed on the upper side, and the reduction gear 20 is disposed on the lower side. Further, the motor 10 and the reduction gear 20 are disposed coaxially.

The reduction gear 20 of the present embodiment is a hollow wave gear device, and includes a rigid internal gear 21, a flexible external gear 22, a wave generating portion 23 and a cross roller bearing 26. The wave generating portion 23 includes a hollow input shaft 24 connected to the rotary shaft 12 of the motor 10, and a wave bearing 25 installed on the outer circumferential side of the input shaft 24. In the present embodiment, the rigid internal gear 21 is the output shaft of the reduction gear 20.

Further, the joint part 2 further includes a rotation regulating mechanism 30 which regulates the rotation of the rotor 11 in a stopped state, a cylindrical tubular member 17 which is inserted on the inner circumferential side of the rotary shaft 12 of the motor 10 and the input shaft 24 of the reduction gear 20, and an output side member 18 fixed to the rigid internal gear 21. The rotation regulating mechanism 30 and the tubular member 17 are simultaneously stored in the case body 80.

As described above, the motor 10 includes the rotor 11 and the stator 14. The rotor 11 includes the rotary shaft 12, and a drive magnet 13 fixed to the rotary shaft 12. The rotary shaft 12 is formed in a substantially cylindrical shape elongated in the vertical direction, and disposed so that the axial direction of the rotary shaft 12 and the vertical direction coincide with each other. That is, the vertical direction is the axial direction of the rotary shaft 12 and is the axial direction of the rotor 11. Moreover, the drive magnet 13 is formed in a cylindrical shape. The length (length of the vertical direction) of the drive magnet 13 is set to be shorter than the rotary shaft 12, and the drive magnet 13 is fixed to the outer circumferential surface of the lower end side portion of the rotary shaft 12.

The stator 14 is formed in a substantially cylindrical shape as a whole and is disposed on the outer circumferential side (the outer side of the radial direction) of the drive magnet 13 so as to cover the outer circumferential surface of the drive magnet 13. An upper end side portion of the rotary shaft 12 protrudes to the upper side relative to an upper end surface of the stator 14. The stator 14 includes a driving coil (not shown), and a stator core (not shown) having a plurality of salient poles around which a driving coil is wound via an insulator. The salient poles of the stator core are formed so as to protrude toward the inner circumferential side, and the tip end surface of the salient poles faces the outer circumferential surface of the drive magnet 13. The motor 10 is fixed to the case body 80. Specifically, the outer circumferential surface of the stator 14 is fixed to the case body 80.

As described above, the reduction gear 20 includes the rigid internal gear 21, the flexible external gear 22, the wave generating portion 23, and the cross roller bearing 26. The rigid internal gear 21 is formed in a substantially flat cylindrical shape and disposed so that the axial direction of the rigid internal gear 21 and the vertical direction coincide with each other. That is, the vertical direction is the axial direction of the rigid internal gear 21, which is the output shaft of the reduction gear 20. Moreover, the rigid internal gear 21 is fixed to an inner ring 26a of the cross roller bearing 26. The outer ring 26b of the cross roller bearing 26 is fixed to a lower end side portion of the case body 80, and the rigid internal gear 21 is rotatably held in the lower end side portion of the case body 80 via the cross roller bearing 26.

The flexible external gear 22 has a flange portion 22a at an upper end and is formed in a flanged substantially cylindrical shape. The flange portion 22a is formed in a substantially annular shape, and an outer circumferential side portion of the flange portion 22a is fixed to the case body 80. That is, the reduction gear 20 is fixed to the case body 80. Further, the rigid internal gear 21 constitutes a lower end side portion of the reduction gear 20. The flange portion 22a of the flexible external gear 22 constitutes an upper end side portion of the reduction gear 20. Internal teeth are formed on an inner circumferential surface of the rigid internal gear 21. External teeth meshing with the internal teeth of the rigid internal gear 21 are formed on the outer circumferential surface of the lower end side of the flexible external gear 22.

As described above, the wave generating portion 23 includes the input shaft 24 and the wave bearing 25. The input shaft 24 is formed in a cylindrical shape which is, as a whole, elongated in the vertical direction and is disposed so that the axial direction of the input shaft 24 and the vertical direction coincide with each other. Further, the portion of the input shaft 24 other than the lower end side portion is formed in a substantially elongated cylindrical shape. The lower end side portion of the input shaft 24 is an elliptical portion 24a in which a shape of an inner circumferential surface thereof is circular when seen in the axial direction of the input shaft 24, and a shape of the outer circumferential surface is elliptical when seen in the axial direction of the input shaft 24.

The upper end side portion of the input shaft 24 of the wave generating portion 23 is inserted and fixed into the inner circumferential side of the lower end side portion of the rotary shaft 12 of the motor 10. Specifically, the upper end side portion of the input shaft 24 is inserted and fixed into the inner circumferential side of the portion to which the drive magnet 13 of the rotary shaft 12 is fixed. The rotary shaft 12 and the input shaft 24 are disposed coaxially. Further, the upper end side portion of the input shaft 24 is fixed to the rotary shaft 12 by bonding.

A center portion of the input shaft 24 in the vertical direction is rotatably supported by a bearing 16. The bearing 16 is a ball bearing. The bearing 16 is installed on a bearing holding member 15, and the bearing holding member 15 is fixed to the case body 80. That is, the input shaft 24 is rotatably supported by the bearing 16 installed in the case body 80 via the bearing holding member 15. The bearing holding member 15 is formed in an annular and flat plate shape and is fixed to the case body 80 so as to overlap the flange portion 22a of the flexible external gear 22 in the vertical direction.

The wave bearing 25 is a ball bearing having a flexible inner ring (not shown) and an outer ring (not shown). The wave bearing 25 is disposed along an outer circumferential surface of the elliptical portion 24a, and is flexed into an elliptical shape. The lower end side portion of the flexible external gear 22 on which the external teeth are formed is disposed on the outer circumferential side of the wave bearing 25 so as to surround the wave bearing 25, and this portion is flexed into an elliptical shape. The external teeth of the flexible external gear 22 mesh with the internal teeth of the rigid internal gear 21 at two places of the lower end side portion of the flexible external gear 22 which is flexed into an elliptical shape in the long axis direction.

The output side member 18 has a flange portion 18a and a cylindrical portion 18b and is formed in a flanged substantially cylindrical shape. The output side member 18 is disposed so that the axial direction of the output side member 18 and the vertical direction coincide with each other, and a through hole 18c penetrating in the vertical direction is formed on the inner circumferential side of the output side member 18. The flange portion 18a is formed in a flat plate shape and an annular shape and is connected to a lower end of the cylindrical portion 18b. The flange portion 18a is fixed to the rigid internal gear 21 so that an upper surface of the flange portion 18a is in contact with a lower surface of the rigid internal gear 21. Further, the flange portion 18a is disposed below a lower end of the case body 80, and disposed outside the case body 80.

A small diameter portion 18d having an outer diameter smaller than the lower end side portion of the cylindrical portion 18b is formed on the upper end side of the cylindrical portion 18b, and an annular stepped surface 18e orthogonal to the vertical direction is formed on the outer circumferential side of an upper end side portion of the cylindrical portion 18b. The small diameter portion 18d is inserted into the inner circumferential side of the lower end side portion of the tubular member 17, and a lower end surface of the tubular member 17 faces the stepped surface 18e. Further, the through hole 18c passes through the inner circumferential side of the tubular member 17. The upper end side portion of the cylindrical portion 18b is disposed on the inner circumferential side of the lower end side portion of the input shaft 24 of the reduction gear 20. The bearing 19 is disposed between the outer circumferential surface of the cylindrical portion 18b and an inner circumferential surface of the lower end side portion of the input shaft 24. The bearing 19 is a ball bearing.

The tubular member 17 is formed in a circular cylindrical shape elongated in the vertical direction, and is disposed so that the axial direction of the tubular member 17 and the vertical direction coincide with each other. As stated above, the tubular member 17 is inserted into the inner circumferential side of the rotary shaft 12 and the input shaft 24. An upper end surface of the tubular member 17 is disposed on the upper side relative to the upper end surface of the rotary shaft 12, and the lower end surface of the tubular member 17 is disposed on the upper side relative to the lower end surface of the input shaft 24. Further, as stated above, the small diameter portion 18d of the output side member 18 is inserted into the inner circumferential side of the lower end side portion of the tubular member 17, the lower end surface of the tubular member 17 faces the stepped surface 18e, and the lower end side of the tubular member 17 is held by the output side member 18.

The upper end side of the tubular member 17 is held by a holding member 50. The holding member 50 is fixed to a support column 51, and the support column 51 is fixed to the case body 80. That is, the holding member 50 is fixed to the case body 80 via the support column 51. The holding member 50 has a circular cylindrical holding portion 50a which holds the upper end side of the tubular member 17. The holding portion 50a is disposed so that the axial direction of the holding portion 50a and the vertical direction coincide with each other, and a through hole 50b penetrating in the vertical direction is formed on the inner circumferential side of the holding portion 50a.

A large diameter portion 50c having an inner diameter larger than that of the upper end side of the holding portion 50a is formed on the lower end side of the holding portion 50a, and an annular stepped surface 50d orthogonal to the vertical direction is formed on the inner circumferential side of a lower end side portion of the holding portion 50a. The upper end side of the tubular member 17 is inserted into the inner circumferential side of the large diameter portion 50c, and the upper end surface of the tubular member 17 faces the stepped surface 50d. Further, the through hole 50b passes through to the inner circumferential side of the tubular member 17.

The position detection mechanism 60 is disposed on the upper side of the stator 14 of the motor 10. The position detection mechanism 60 includes a slit plate 61 fixed to the upper end side of the rotary shaft 12 and a sensor 62. The sensor 62 is a transmission type optical sensor including a light emitting element and a light receiving element disposed so as to face each other. The sensor 62 is fixed to a fixed member 35 as an encoder holder.

The fixed member 35 is fixed to the case body 80. That is, the sensor 62 is fixed to the case body 80 via the fixed member 35. The slit plate 61 of the position detection mechanism 60 is formed to have a thin annular plate shape. A plurality of slit holes (not shown) are formed in the slit plate 61 at regular intervals in the circumferential direction of the slit plate 61. The slit plate 61 is fixed to the rotary shaft 12 of the motor 10 so that a portion of the circumferential direction of the slit plate 61 is disposed between the light emitting element and the light receiving element of the sensor 62.

The case body 80 includes a case main body 81 in which the upper and lower ends thereof open, and a cover 82 which closes an opening on the upper end side of the case main body 81. The opening on the lower end side of the case main body 81 is closed by the reduction gear 20. An opening portion 81a opening in a direction orthogonal to the vertical direction is formed in a side surface of the case main body 81. That is, the opening portion 81a opening in the direction orthogonal to the vertical direction is formed in the case body 80. The opening portion 81a is formed so as to penetrate the side surface portion of the case main body 81.

Further, a through hole 82a facing the upper end portion of the plunger 41a of a solenoid 41 constituting a drive mechanism 40 to be described later is formed on the upper surface portion of the cover 82. That is, the through hole 82a is formed on the case body 80. The through hole 82a is formed so as to penetrate the upper surface portion of the cover 82 in the vertical direction, and the inside and the outside of the case body 80 communicate with each other via the through hole 82a. Further, the through hole 82a is formed to have a substantially round hole shape, and a substantially cylindrical wall 82b protruding to the lower side is integrally provided on the periphery of the through hole 82a on the inner surface of the case body 80 (cover 82).

As shown in FIG. 3 and FIG. 4A and FIG. 4B, the rotation regulating mechanism 30 is provided to hold the rotor 11 in a stopped state, and is housed in the case body 80. This rotation regulating mechanism 30 is constituted by a flat and substantially annular rotation-side regulating member (first regulating member) 31, a regulation pin (second regulating member) 32 for engaging with the rotation-side regulating member 31 to regulate the movement of the rotation-side regulating member 31 in the circumferential direction of the rotation-side regulating member 31, and a drive mechanism 40 for moving the regulation pin 32 in the vertical direction along the axial direction of the rotor 11.

As shown in FIG. 3 and FIG. 6A and FIG. 6B, the drive mechanism 40 includes a compression coil spring 42 as the biasing member for biasing the regulation pin 32 to the upper side, and the solenoid 41 which moves the regulation pin 32 to the lower side via the plunger 41a. The solenoid 41 is fixed onto the case body 80 so that the plunger 41a of the solenoid 41 projects to the lower side when the solenoid 41 is in an energized state. The upper end portion (other end portion) of the plunger 41a protrudes to the upper side relative to a main body portion 41b of the solenoid 41.

The plunger 41a of the solenoid 41 moves the regulation pin 32 along the axial direction of the rotor 11 to the regulation release position to be described later by abutting and pressing against the regulation pin 32 at a lower end portion (one end portion) of the plunger 41a. Further, the upper end portion of the plunger 41a is provided so as to be positioned on the inside of the case body 80 when the solenoid 41 is in a non-energized state, in other words, even when the plunger 41a moves to the upper side and the regulation pin 32 is in the regulation position to be described later.

Specifically, as stated above, the through hole 82a of the case body 80 is formed in a portion facing the other end portion opposite to the one end portion abutting against the regulation pin 32 of plunger 41a of the solenoid 41. Moreover, the upper end portion of the plunger 41a of the solenoid 41 is positioned on the lower side of the through hole 82a in a state offset from the through hole 82a of the case body 80 in the axial direction of the rotor 11 while the regulation pin 32 is in the regulation position. However, at this time, the upper end portion of the plunger 41a of the solenoid 41 is disposed to be easily seen through the through hole 82a of the case body 80.

As shown in FIG. 3, the rotation-side regulating member 31 is fixed onto the upper end surface of the rotary shaft 12 of the rotor 11 so that the thickness direction of the rotation-side regulating member 31 and the vertical direction coincide with each other, and is disposed on the upper side relative to the position detection mechanism 60. As shown in FIG. 5, the plurality of protrusions 31a projecting to the outside of the radial direction of the rotation-side regulating member 31 are formed at regular intervals along the circumferential direction of the rotation-side regulating member 31 in the outer circumferential surface of the rotation-side regulating member 31. In the present embodiment, twelve protrusions 31a are formed at a 30° pitch with respect to the center of the rotation-side regulating member 31. Further, the protrusions 31a are formed so as to have a substantially isosceles trapezoidal shape when viewed from the vertical direction. The number of protrusions 31a formed in the rotation-side regulating member 31 is not specifically limited, and may be 11 or less, and may be 13 or more.

As shown in FIG. 3, FIG. 4A and FIG. 4B and FIG. 6A and FIG. 6B, the regulation pin 32 is a circular columnar member with a uniform cross-sectional shape perpendicular to the axial direction (vertical direction) of the rotor 11, and is disposed so that the axial direction of the regulation pin 32 and the vertical direction coincide with each other. The regulation pin 32 is fixed to the plunger 41a disposed on the upper side of the regulation pin 32. Specifically, the regulation pin 32 is fixed in a state that is abutted against the lower end portion of the plunger 41a.

As shown in FIG. 4A and FIG. 4B and FIG. 6A and FIG. 6B, a recess 32a recessed toward the upper side is formed on the lower end surface of the regulation pin 32, and the upper end side portion of the compression coil spring 42 of the drive mechanism 40 is disposed in the recess 32a.

In the present embodiment, the regulation pin 32 is formed to have a circular columnar shape, but it is not limited thereto. It may have a polygonal prism shape as long as it is a columnar member having a uniform cross-sectional shape perpendicular to the vertical direction; for example, a triangular prism, a quadrangular prism, a hexagonal prism and the like can be appropriately used.

Further, when viewed from the vertical direction, the regulation pin 32 is disposed on the outer circumferential side of the rotation-side regulating member 31. Specifically, as shown in FIG. 5, when viewed from the vertical direction, the regulation pin 32 is disposed so that a portion of the regulation pin 32 relative to a virtual circle VC which connects the tip end surfaces of the plurality of protrusions 31a of the rotation-side regulating member 31 is disposed on the inside of the radial direction of the rotation-side regulating member 31. As shown in FIG. 3 and FIG. 4A and FIG.

4B, the cross-sectional shape perpendicular to the vertical direction is formed in a uniform columnar shape in the same manner as a linear brush 33, and is disposed so that the axial direction of the linear brush 33 and the vertical direction coincide with each other.

The linear brush 33 is inserted and disposed as a whole in a recess 35a (refer to FIG. 4A and FIG. 4B) formed on the upper surface of the fixed member 35. The lower end surface of the linear brush 33 abuts against the bottom surface of the recess 35a. Further, a recess 35b in which the lower end side portion of the compression coil spring 42 of the drive mechanism 40 is disposed is formed on the bottom surface of the recess 35a so as to be recessed toward the lower side. The regulation pin 32 is inserted and disposed as a whole in the inner circumferential side of the linear brush 33.

Further, in the present embodiment, the solenoid 41 of the drive mechanism 40 is in a non-energized state at the time that the motor 10 is in a stopped state, and is in an energized state at the time of the driving of the motor 10. As shown in FIG. 4B, when the solenoid 41 is not in an energized state, the regulation pin 32 rises so that the regulation pin 32 is disposed between the protrusions 31a of the rotation-side regulating member 31 due to the biasing force of the compression coil spring 42 of the drive mechanism 40. Therefore, the rotation of the rotor 11 in a stopped state is regulated by the engagement between the protrusions 31a of the rotation-side regulating member 31 and the regulation pin 32. On the other hand, if the solenoid 41 is in an energized state, as shown in FIG. 4A, the plunger 41a protrudes to the lower side to lower the regulation pin 32 until the regulation pin 32 disengages from between the protrusions 31a of the rotation-side regulating member 31. Therefore, the rotor 11 is able to rotate.

Therefore, the drive mechanism 40 moves the regulation pin 32 between the regulation position (the position shown in FIG. 4B) in which the regulation pin 32 is disposed between the protrusions 31a of the rotation-side regulating member 31 and the regulation release position (the position shown in FIG. 4A) in which the regulation pin 32 disengages from between the protrusions 31a of the rotation-side regulating member 31. Further, the compression coil spring 42 of the drive mechanism 40 biases the regulation pin 32 toward the regulation position. The solenoid 41 moves the regulation pin 32 which is in the regulation position toward the regulation release position.

Moreover, as shown in FIG. 6A, when the regulation pin 32 is in the regulation position, the upper end portion of the plunger 41a of the solenoid 41 is positioned on the inside of the wall 82b of the case body 80, and stored on the inside of the case body 80, and thus, is not exposed to the outside of the case body 80. Moreover, if, for example, a rod-shaped member and the like is used to press the upper end portion of the plunger 41a through the through hole 82a toward the inside (that is, if pressed toward the lower side), as shown in FIG. 6B, the regulation pin 32 which is in the regulation position moves to the regulation release position. At this time, the upper end portion of the plunger 41a of the solenoid 41 is disposed so that it is difficult to be seen through the through hole 82a of the case body 80.

Further, as shown in FIG. 6A, while the regulation pin 32 is in the regulation position, the upper end surface (the surface abutting against one end portion of the plunger 41a in the regulation pin 32) of the regulation pin 32 is provided so as to be positioned on the upper side relative to the surface opposite the regulation pin 32 in the rotation-side regulating member 31, i.e., the upper end surface of the rotation-side regulating member 31 in a state in which the regulation pin 32 is in the regulation release position (refer to FIG. 6B). In other words, the upper end surface of the regulation pin 32 in a state in which the regulation pin 32 is in the regulation position is positioned further outside between the protrusions 31a sandwiching the regulation pin 32 in the axial direction of the rotor 11 (the direction of movement of the regulation pin 32). In other words, the upper end surface of the regulation pin 32 in the state in which the regulation pin 32 is in the regulation position protrudes from between the protrusions 31a sandwiching the regulation pin 32 in the axial direction of the rotor 11.

By this kind of configuration, the regulation pin 32 of the embodiment is a regulating part which enters between the protrusions 31a of the rotation-side regulating member 31 to regulate the movement of the rotation-side regulating member 31. When the regulation pin 32 is in the regulation release position, the plunger 41a of the drive mechanism 40 disposed on the outer circumferential side of the rotation-side regulating member 31 is disposed in a position which does not contact with the protrusions 31a of the rotation-side regulating member 31.

As shown in FIG. 3, the circuit board B is a rigid board such as a glass epoxy board and is formed to have a flat plate shape. This circuit board B is fixed to the case body 80 so that the thickness direction of the circuit board B and the vertical direction coincide with each other. Further, the circuit board B is fixed to the upper end side of the case body 80, and is disposed on the upper side relative to the rotation-side regulating member 31. The upper end of the tubular member 17 is disposed on the upper side relative to an upper surface of the circuit board B.

A motor driving circuit for driving the motor 10 and a signal transmission circuit for outputting a signal output to the circuit board B to the outside of the circuit board B are mounted on the circuit board B. Further, at least two connectors are mounted on the circuit board B. Wiring connected to one of the connectors among the two connectors is disposed to pass through the inner circumferential side of the tubular member 17 and then drawn out from the through hole 18c of the output side member 18. The wiring connected to the other connector is drawn out from the opening portion 81a of the case body 80.

(Connecting Structure of Joint Part and Arm)

The connection structure of the joint part 2 and the arm 3 of the robot 1 according to the present embodiment will be described referring back to FIG. 2A and FIG. 2B.

As described above, the support member 4 and the first joint part 2A are connected to be relatively rotatable, and the first joint part 2A and the second joint part 2B are connected to be relatively rotatable. Further, the second joint part 2B and the base end of the first arm 3A are fixed together, the tip end of the first arm 3A and the third joint part 2C are fixed together, and the third joint part 2C and the fourth joint part 2D are connected to be relatively rotatable. Further, the fourth joint part 2D and the base end of the second arm 3B are connected to be relatively rotatable, the tip end of the second arm 3B and the fifth joint part 2E are fixed together, and the fifth joint part 2E and the sixth joint part 2F are connected to be relatively rotatable. Specifically, for example, each of the joint parts 2 and the arms 3 are connected as described below so that the robot 1 can perform an operation shown in FIG. 2B.

In the following description, the axial direction of the rigid internal gear 21 of the first joint part 2A is referred to as "the axial direction of the first joint part 2A", and the axial direction of the rigid internal gear 21 of the second joint part 2B is referred to as "the axial direction of the second joint part 2B". Further, the axial direction of the rigid internal gear 21 of the third joint part 2C is referred to as "the axial direction of the third joint part 2C", and the axial direction of the rigid internal gear 21 of the fourth joint part 2D is referred to as "the axial direction of the fourth joint part 2D". Further, the axial direction of the rigid internal gear 21 of the fifth joint part 2E is referred to as "the axial direction of the fifth joint part 2E", and the axial direction of the rigid internal gear 21 of the sixth joint part 2F is referred to as "the axial direction of the sixth joint part 2F".

First, the support member 4 and the first joint part 2A are connected to the flange portion 18a of the first joint part 2A by fixing an end surface of the support member 4 on the side, at which the flange portion 4a is not formed. That is, the support member 4 and the first joint part 2A are connected so that the axial direction of the first joint part 2A and the axial direction of the support member 4 coincide with each other. The first joint part 2A and the second joint part 2B are connected so that the axial direction of the first joint part 2A and the axial direction of the second joint part 2B are orthogonal to each other. Further, the side surface of the case main body 81 of the first joint part 2A on which the opening portion 81a is formed is fixed to the flange portion 18a of the second joint part 2B.

The second joint part 2B and the first arm 3A are connected so that the axial direction of the second joint part 2B and the longitudinal direction (axial direction) of the first arm 3A are orthogonal to each other. Further, the base end of the first arm 3A is fixed to the side surface of the case main body 81 of the second joint part 2B in which the opening portion 81a is formed. The first arm 3A and the third joint part 2C are connected so that the longitudinal direction of the first arm 3A and the axial direction of the third joint part 2C are orthogonal to each other. Further, the tip end of the first arm 3A is fixed to the side surface of the case main body 81 of the third joint part 2C in which the opening portion 81a is formed.

The third joint part 2C and the fourth joint part 2D are connected so that the axial direction of the third joint part 2C and the axial direction of the fourth joint part 2D are orthogonal to each other. Further, the side surface of the case main body 81 of the fourth joint part 2D in which the opening portion 81a is formed is fixed to the flange portion 18a of the third joint part 2C. More specifically, the side surface of the case main body 81 of the fourth joint part 2D in which the opening portion 81a is formed is fixed to the flange portion 18a of the third joint part 2C via a connecting member 5 fixed to the side surface of the case main body 81 of the fourth joint part 2D in which the opening portion 81a is formed. The connecting member 5 has a flange portion 5a fixed to the flange portion 18a of the third joint part 2C and is formed in a flanged circular cylindrical shape.

The fourth joint part 2D and the second arm 3B are connected so that the axial direction of the fourth joint part 2D and the longitudinal direction of the second arm 3B coincide with each other. Further, the base end of the second arm 3B is fixed to the flange portion 18a of the fourth joint part 2D. Note that, a flange portion 3a for fixing the base end of the second arm 3B to the flange portion 18a of the fourth joint part 2D is formed at the base end of the second arm 3B, and the flange portion 18a of the fourth joint part 2D and the flange portion 3a are fixed to each other.

The second arm 3B and the fifth joint part 2E are connected so that the longitudinal direction of the second arm 3B and the axial direction of the fifth joint part 2E are orthogonal to each other. Further, the tip end of the second arm 3B is fixed to the side surface of the case main body 81 of the fifth joint part 2E in which the opening portion 81a is formed. The fifth joint part 2E and the sixth joint part 2F are connected so that the axial direction of the fifth joint part 2E and the axial direction of the sixth joint part 2F are orthogonal to each other. Further, the side surface of the case main body 81 of the sixth joint part 2F in which the opening portion 81a is formed is fixed to the flange portion 18a of the fifth joint part 2E.

Main Effect of this Embodiment

As described above, the joint part 2 of the present embodiment includes the motor 10 having the rotor 11 and the stator 14, the rotation regulating mechanism 30 for regulating the rotation of the rotor 11 in a stopped state, and the case body 80 in which the motor 10 and the rotation regulating mechanism 30 are housed, wherein the rotation regulating mechanism 30 has the annular rotation-side regulating member 31 fixed to the rotor 11, the regulation pin 32 inserted between the plurality of protrusions 31a formed along the outer circumferential surface of the rotation-side regulating member 31 in the circumferential direction to regulate the movement of the rotation-side regulating member 31 in the circumferential direction, and the drive mechanism 40 for moving the regulation pin 32 in the axial direction of the rotor 11 between the regulation position in which the regulation pin 32 is disposed between the protrusions 31a in the circumferential direction and the regulation release position in which the regulation pin 32 is disengaged from between the protrusions 31a in the circumferential direction. The drive mechanism 40 includes the compression coil spring 42 for biasing the regulation pin 32 toward the regulation position, and the solenoid 41 for moving the regulation pin 32 toward the regulation release position. The through hole 82a is formed in the case body 80, in a portion facing the upper end portion of the plunger 41a of the solenoid 41, and the upper end portion of the plunger 41a is positioned on the inside of the case body 80 while the regulation pin 32 is in the regulation position.

In the joint part 2 having this kind of configuration, the upper end portion of the plunger 41a of the solenoid 41 is disposed on the inside of the case body 80 even if the regulation pin 32 is in either of the regulation position or the regulation release position, and furthermore, the through hole 82a which can press the upper end portion of the plunger 41a from the outside of the case body 80 is formed in the portion of the case body 80 facing the upper end portion of the plunger 41a. Therefore, when the regulation pin 32 is in the regulation position, it is possible to perform the regulation release of the regulation pin 32 from the outside of the case body 80 by passing through the through hole 82a of the case body 80 and pressing the upper end portion of the plunger 41a of the solenoid 41. Further, the plunger 41a of the solenoid 41 is not exposed to the outside from the case body 80, thus, unintended contact can be avoided in order to prevent an unexpected regulation release.

Further, in the present embodiment, the wall 82b is provided on the periphery of the through hole 82a on the inner surface of the case body 80. Therefore, the wall 82b functions as a reinforcement portion so that the rigidity of the peripheral portion of the through hole 82a can increase even if a through hole 82a is formed in the case body 80.

Further, in the present embodiment, the regulation pin 32 is a columnar member with a uniform cross-sectional shape perpendicular to the axial direction. Therefore, a large contact area with the fixed member 35 which supports the regulation pin 32 to be slidably movable can be obtained, thus, when making an engagement between the protrusions 31a of the rotation-side regulating member 31 and the regulation pin 32, the surface pressure accompanying the engagement can be reduced. Therefore, the load of the fixed member 35 can be reduced and the influence of wear and stress on the fixed member 35 can be suppressed compared to a conventional regulating member. Further, the structure can be simplified compared to a conventional regulating member, and thus, the manufacturing cost can be reduced. Further, regulation can be reliably performed even when the engagement position between the rotation-side regulating member 31 and the regulation pin 32 is disengaged in the vertical direction (axial direction), and a margin can be provided for the positioning accuracy of the regulation pin 32.

Further, in the present embodiment, while the regulation pin 32 is in the regulation position, the upper end surface of the regulation pin 32 is positioned on the plunger 41a side relative to the upper end surface of the rotation-side regulating member 31 in the state in which the regulation pin 32 is in the regulation release position. In other words, the upper end surface of the regulation pin 32 in the state in which the regulation pin 32 is in the regulation position is positioned further outside between the protrusions 31a of the rotation-side regulating member 31. Therefore, the engagement between the rotation-side regulating member 31 and the regulation pin 32 can be performed more reliably.

Another Embodiment

The above-described embodiment is an example of a preferred embodiment of the present invention, but the present invention is not limited thereto, and various modifications can be made without changing the gist of the present invention.

In the above-described embodiment, the upper end portion of the plunger 41a of the solenoid 41 (other end portion) is positioned on the lower side of the through hole 82a in a state offset from the through hole 82a of the case body 80 in the axial direction of the rotor 11 while the regulation pin 32 is in the regulation position, but it is not limited thereto.

Figure 7:
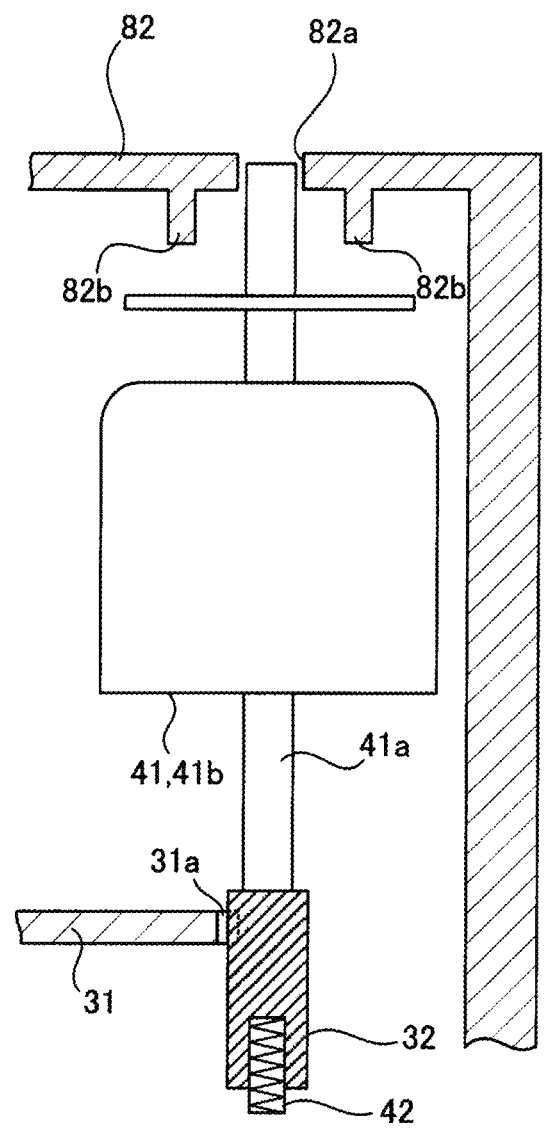
FIG. 7 is an enlarged view for describing a modified example of the plunger according to the embodiment of the present invention.

As the modified example of the above-described embodiment, as shown in FIG. 7, the length of the upper end portion of the plunger 41a projecting to the upper side is set to be longer than the length of the main body portion 41b of the solenoid 41, and the upper end portion of the plunger 41a may also be provided so as to be positioned on the inside of the through hole 82a of the case body 80 while the regulation pin 32 is in the regulation position. In this case, the upper end portion of the plunger 41a of the solenoid 41 is not exposed to the outside of the case body 80 in the same manner as the above-described embodiment.

According to the modified example, the upper end portion of the plunger 41a of the solenoid 41 becomes easier to see through the through hole 82a of the case body 80. Therefore, the upper end portion of the plunger 41a can be more easily pressed from the outside of the case body 80. Further, when the upper end portion of the plunger 41a is pushed, it becomes difficult to see the upper end portion of the plunger 41a from the through hole 82a, thus, it can be more easily understood that the regulation release of the regulation pin 32 is performed.

Figure 8:
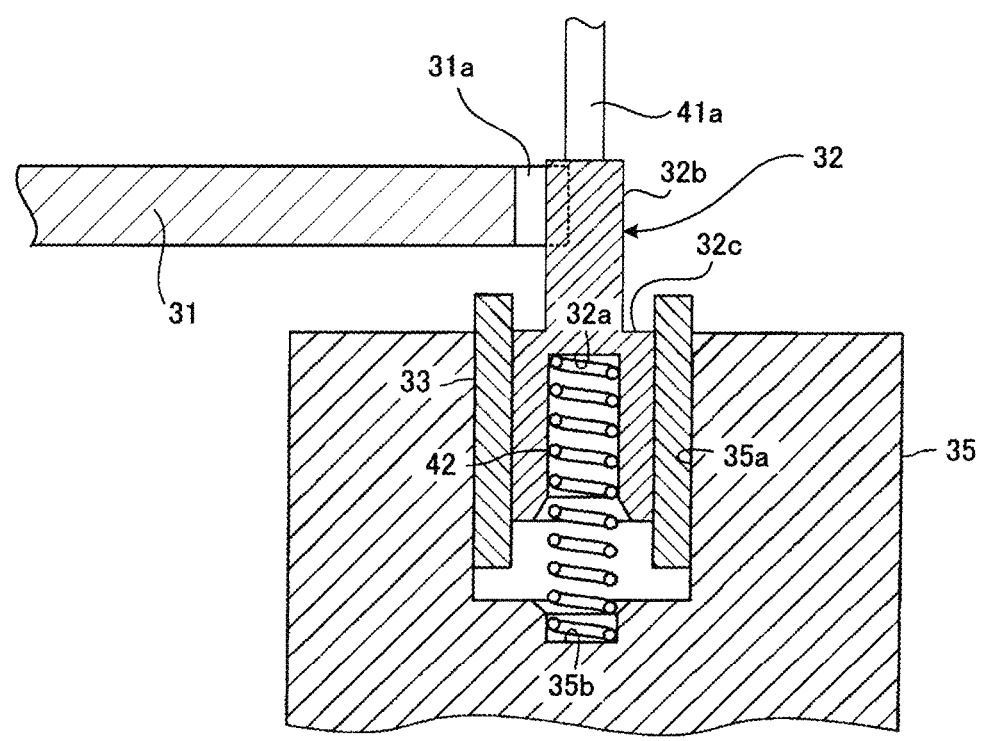
FIG. 8 is an enlarged view for describing a modified example of the regulation pin according to the embodiment of the present invention.

In the above-described embodiment, the regulation pin 32 is provided with a columnar member with a uniform cross-sectional shape perpendicular to the axial direction, but it is not limited thereto. As the modified example of the above-described embodiment, as shown in FIG. 8, the small diameter portion 32b having an inner diameter smaller than the lower end side of the regulation pin 32 is formed on the upper end side of the regulation pin 32, and an annular stepped surface 32c orthogonal to the vertical direction may also be formed in the vicinity of the lower side of the small diameter portion 32b of the regulation pin 32. The lower end side of the regulation pin 32 is inserted in the recess 35a of the fixed member 35, and the upper end portion of the regulation pin 32 is the engagement portion for engaging with the rotation-side regulating member 31. In this case, when making an engagement between the protrusions 31a of the rotation-side regulating member 31 and the regulation pin 32, the surface pressure accompanying the engagement can be reduced.

In the above-described embodiment, the through hole 82a is formed in the portion which faces the upper end portion of the plunger 41a in the cover 82 of the case body 80, but this through hole 82a may be eliminated, and the upper end portion of the plunger 41a may be covered with the cover 82 so that it is not exposed to the outside of the case body 80.

Figure 9A:
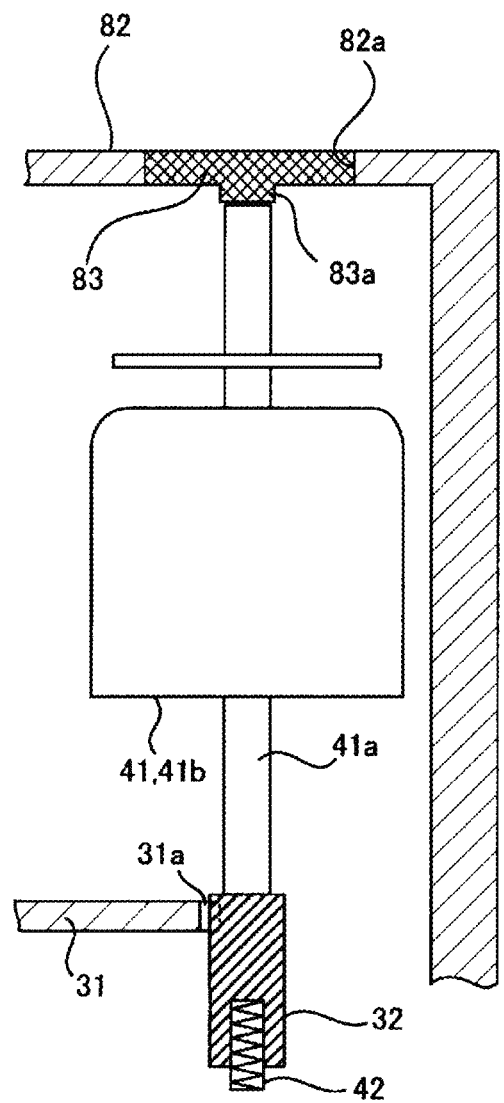
FIG. 9A and FIG. 9B are enlarged views for describing the modified example of the configuration of the H portion shown in FIG. 3.
Figure 9B:
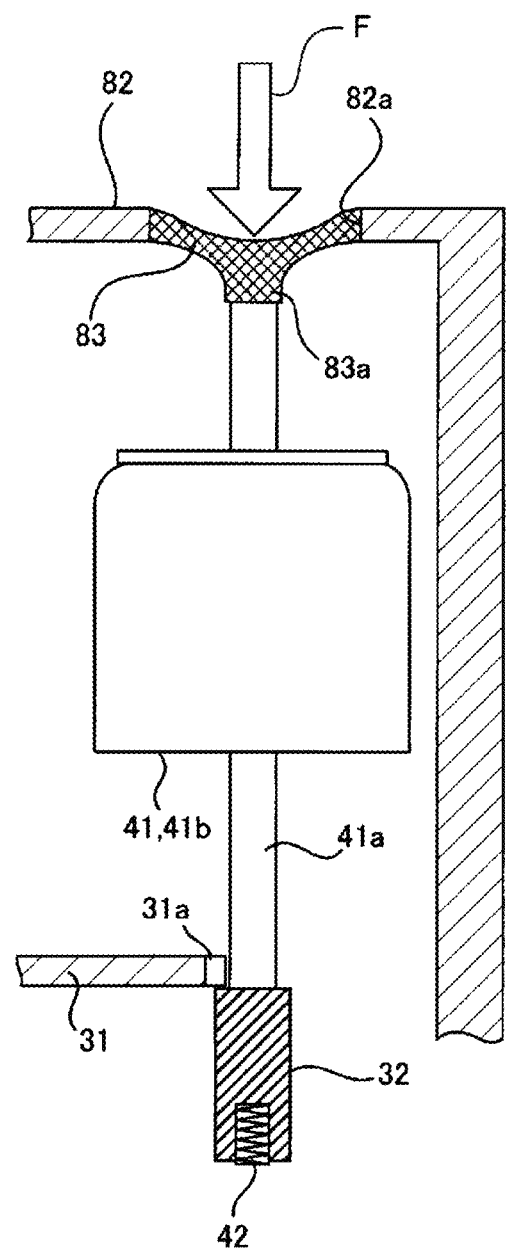

FIG. 9A and FIG. 9B are enlarged view for describing the modified examples of the configuration of the H portion shown in FIG. 3. FIG. 9A is an enlarged view for describing the state when the regulation pin 32 is in the regulation position, and FIG. 9B is an enlarged view for describing the state in which the plunger 41a is pressed downwards from the state in FIG. 9A to move the regulation pin 32 to the regulation release position.

The modified example shown in FIG. 9A and FIG. 9B are the same configurations as in FIG. 6A and FIG. 6B with the exceptions that the through hole 82a formed in a position which faces the upper end portion of the plunger 41a in the cover 82 is filled with an elastic material 83, and the wall 82b is eliminated.

As shown in FIG. 9B, the elastic material 83 is an elastic material which may receive an external force F from the outside (a side that is opposite to the upper end portion of the plunger 41a) of the cover 82, be deformed to the upper end portion of the plunger 41a, and abut against the upper end portion. The elastic material 83 is not limited as long as it has elasticity, but, for example, rubber, silicone, an elastomer and the like can be used.

Furthermore, the elastic material 83 has a projection 83a projecting toward the upper end portion of the plunger 41a on a surface on the inside (upper end portion side of the plunger 41a side) of the cover 82. When the elastic material 83 receives the external force F, the projection 83a abuts against the upper end portion of the plunger 41a to push the plunger 41a downwards.

As shown in FIG. 9A, in a state in which the solenoid 41 is not energized, the plunger 41a is biased upwards due to the biasing force of the compression coil spring 42, and the plunger 41a and the elastic material 83 are in the vicinity or are in contact with each other. When performing the regulation release, an operator presses the elastic material 83 downward with a finger or the like from the outside of the cover 82. Due to the external force F by this pressing, as shown in FIG. 9B, the elastic material 83 is displaced downwards, and the projection 83a presses the upper end downwards while abutting against the upper end portion of the plunger 41a. In short, the external force F due to this pressing is transmitted from the projection 83a to the upper end portion of the plunger 41a. Therefore, the plunger 41a moves downward, and the regulation pin 32 moves to the regulation release position.

According to the modified example shown in FIG. 9A and FIG. 9B, the plunger 41a is not exposed to the outside from the case body 80, thus, unintended contact with the plunger 41*a* can be avoided so as to prevent an unexpected regulation release. Further, the mixing of foreign matter on the inside of the case body 80 can be prevented. Further, the elastic material 83 has a projection 83*a*, thus, it becomes easy to concentrate the external force F on the projection 83*a*, and it becomes easy to perform the regulation release operation.

In the above-described embodiment, the elastic material 83 and the cover 82 are separate bodies, and the elastic material 83 is embedded in a part of the cover 82. However, the entirety of the cover 82 is formed by, for example, resin and the like, and it is also possible to construct so that this portion has an elasticity by forming the portion facing the upper end portion of the plunger 41*a* in the cover 82 to be thin. According to his configuration, the cover 82 can be integrally formed with the elastic material 83, and the manufacturing cost can be reduced.

Figure 10:
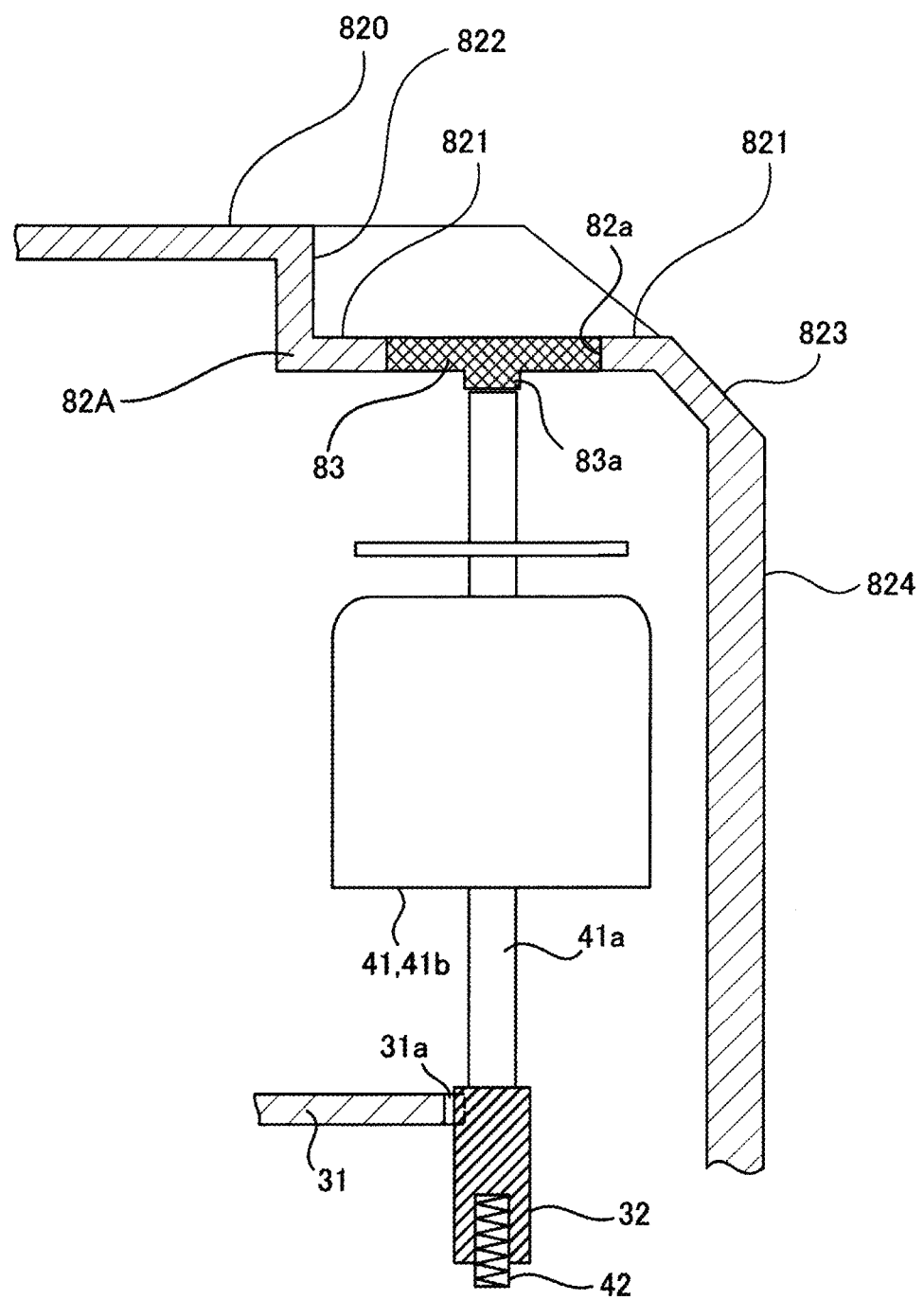
FIG. 10 is a schematic diagram for describing the modified example of the shape of a case body, and is a diagram illustrating the configuration of the H portion shown in FIG. 3.

FIG. 10 is a schematic diagram illustrating the configuration of the cover 82A which is the modified example of the shape of the cover 82 shown in FIG. 9A and FIG. 9B, and is a diagram illustrating the configuration of the H portion shown in FIG. 3. The cover 82A shown in FIG. 10 is configured by surfaces 820 and 821 in which the outer surface of the upper end is perpendicular to the axial direction of the rotation-side regulating member 31, and a surface 822 which connects the surface 820 with the surface 821 and is parallel to the axial direction of the rotation-side regulating member 31. The surface 821 constitutes the outer surface of the region on which the elastic material 83 in the cover 82A is formed.

Further, the cover 82A has, as an outer surface, a side surface 824*a* parallel to the axial direction of the rotation-side regulating member 31 on the outer side of the radial direction of the rotation-side regulating member 31 relative to the elastic material 83. The cover 82A furthermore has, as the outer surface, an inclined surface 823 connecting the side surface 824 with the surface 821 and inclined toward the surface 821.

According to the modified example shown in FIG. 10, in the configuration in which the elastic material 83 is integrally formed with the cover 82 as described above, the position (position indicated by reference numeral F1 in FIG. 3) of the fulcrum supporting the deformation of the cover 82 when the elastic material 83 is pressed is a position far from the portion where the elastic material 83 is formed, thus, the cover 82 is easily flexed, and as a result, a portion of the elastic material 83 is easily flexed. Further, the position of the fulcrum supporting the deformation of the cover 82 when the elastic material 83 is pressed is the portion that connects the inclined surface 823 with the side surface 824 on the outer side of the radial direction of the rotation-side regulating member 31 relative to the portion where the elastic material 83 is formed, and the cover 82 and this portion are easily flexed due to the inclined surface 823. As a result, it becomes easy to perform the regulation release work, and it becomes possible to perform the regulation release rapidly and reliably.

In the above-described embodiment, the compression coil spring 42 of the drive mechanism 40 biases the regulation pin 32 to the upper side, and the solenoid 41 moves the regulation pin 32 to the lower side, but it is not limited thereto. For example, the compression coil spring 42 may also bias the regulation pin 32 to the lower side, and the solenoid 41 may also move the regulation pin 32 to the upper side. Further, in the above-described embodiment, the regulation pin 32 is biased by the compression coil spring 42 of the drive mechanism 40, but it is not limited thereto. For example, the regulation pin 32 may also be biased by other spring members such as a tension coil spring.

In the above-described embodiment, the rigid internal gear 21 is the output shaft of the reduction gear 20, but it is not limited thereto. For example, the flexible external gear 22 may also be the output shaft of the reduction gear 20. In this case, the rigid internal gear 21 is fixed onto the case body 80 and the inner ring 26*a* of the cross roller bearing 26, and the flexible external gear 22 is fixed onto the outer ring 26*b* of the cross roller bearing 26 and the flange portion 18*a* of the output side member 18. Further, in the above-described embodiment, the reduction gear 20 is a hollow wave gear device, but it is not limited thereto. For example, the reduction gear 20 may be a hollow reduction gear other than a hollow wave gear device. Further, the reduction gear 20 may be a reduction gear other than a hollow reduction gear. Further, in the above-described embodiment, the motor 10 is a hollow motor, but it is not limited thereto. For example, the motor 10 may be a motor other than a hollow motor. Further, in the above-described embodiment, the motor 10 is a so-called inner rotor type motor, but it is not limited thereto. For example, the motor 10 may be an outer rotor type motor.

In the above-described embodiment, the robot 1 has six joint parts 2, but it is not limited thereto. For example, the number of joint parts 2 provided by the robot 1 may be five or less and may be seven or more. Further, in the above-described embodiment, the robot 1 has two arms 3, but it is not limited thereto. For example, the number of arms 3 provided by the robot 1 may be one and may be three or more. Further, in the above-described embodiment, the joint part 2 of the robot 1 is constituted by the rotary actuator having the motor 10, the reduction gear 20 and the like, but it is not limited thereto. For example, the rotary actuator may be used in a part other than the joint part 2 of the robot 1. Further, the rotary actuator may be used in a θ stage drive unit (rotary stage) and the like. Further, in the above-described embodiment, the robot 1 is an industrial robot, but the robot 1 may be applied to various applications. For example, the robot 1 may be a service robot.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A rotary actuator comprising:
a motor having a rotor and a stator;
a rotation regulating mechanism configured to regulate a rotation of the rotor in a stopped state; and
a case body in which the motor and the rotation regulating mechanism are housed, wherein
the rotation regulating mechanism has an annular rotation-side regulating member fixed to the rotor, a regulating member inserted between a plurality of protrusions formed along a circumferential direction on an outer circumferential surface of the rotation-side regulating member and configured to regulate a movement of the rotation-side regulating member in the circumferential direction, and a drive mechanism configured to move the regulating member in an axial direction of the rotor between a regulation position in which the regulating member is disposed between the protrusions in the circumferential direction and a regulation release position in which the regulating member is disengaged from between the protrusions in the circumferential direction, the drive mechanism has a biasing member configured to bias the regulating member toward the regulation position, and a solenoid configured to move the regulating member toward the regulation release position, a plunger of the solenoid has one end portion abutting against the regulating member, and an other end portion opposite to the one end portion, the other end portion of the plunger of the solenoid is positioned in the case body and is covered by the case body so as to not be exposed while the regulating member is in the regulation position, and a portion in the case body, which faces the other end portion of the plunger, is composed of a member having an elasticity capable of being deformed to the other end portion and abutting against the other end portion by receiving an external force from a side that is opposite to the other end portion.

2. The rotary actuator according to claim 1, wherein projections projecting toward the other end portion are formed on a surface of the portion in the case body, which faces the other end portion side.

3. The rotary actuator according to claim 1, wherein an outer surface of a region in which the portion is formed in the case body is perpendicular to the axial direction of the rotation-side regulating member, a side surface of the case body parallel to the axial direction is formed on the outer side of a radial direction of the rotation-side regulating member with respect to the portion, and an inclined surface structured to connect the outer surface of the region with the side surface and inclined relative to the outer surface is formed in the case body.

* * * * *